United States Patent [19]

Hazebrook et al.

[11] Patent Number: 5,184,979

[45] Date of Patent: * Feb. 9, 1993

[54] QUICK DISCONNECT CONSTANT VELOCITY UNIVERSAL JOINT

[75] Inventors: Daniel W. Hazebrook, Detroit; Steven C. Hahn, Rochester, both of Mich.

[73] Assignee: GKN Automotive, Inc., Auburn Hills, Mich.

[*] Notice: The portion of the term of this patent subsequent to Jul. 17, 2007 has been disclaimed.

[21] Appl. No.: 650,485

[22] Filed: Feb. 5, 1991

Related U.S. Application Data

[60] Continuation-in-part of Ser. No. 552,260, Jul. 13, 1990, abandoned, which is a continuation of Ser. No. 170,944, Mar. 21, 1988, Pat. No. 4,941,862, which is a division of Ser. No. 945,183, Dec. 23, 1986, Pat. No. 4,753,626.

[51] Int. Cl.[5] .............................................. F16D 3/221
[52] U.S. Cl. .................................... 464/141; 403/328; 464/901; 464/906
[58] Field of Search ............... 464/139, 141, 906, 901; 403/328, 327, 325, 322, DIG. 6; 81/177.85, 177.2; 200/533, 542

[56] References Cited

U.S. PATENT DOCUMENTS

| | | | |
|---|---|---|---|
| 1,589,977 | 6/1926 | Lucas | 200/533 X |
| 2,885,893 | 5/1959 | Lane et al. | 403/325 X |
| 2,991,343 | 7/1961 | Norden | 200/533 |
| 3,208,318 | 9/1965 | Roberts | 403/327 X |
| 3,469,871 | 9/1969 | Betts | 403/325 |
| 3,608,937 | 9/1971 | Nave | 403/327 X |
| 3,762,245 | 10/1973 | Smyers et al. | 81/177.85 |
| 4,453,449 | 6/1984 | Hollmann | 403/328 X |
| 4,794,828 | 1/1989 | Olson | 81/177.85 |
| 4,817,476 | 4/1989 | Karge | 81/177.85 |
| 4,865,485 | 9/1989 | Finnefrock | 403/325 X |
| 4,941,862 | 7/1990 | Hazebrook et al. | 464/141 |

FOREIGN PATENT DOCUMENTS

| | | | |
|---|---|---|---|
| 0046501 | 1/1965 | Fed. Rep. of Germany | 464/141 |
| 1206985 | 12/1965 | Fed. Rep. of Germany | 200/533 |
| 0047212 | 12/1972 | U.S.S.R. | 464/141 |

Primary Examiner—Katherine Matecki
Assistant Examiner—Tony A. Gayoso
Attorney, Agent, or Firm—Harness, Dickey & Pierce

[57] ABSTRACT

A quick disconnect constant velocity universal joint for transmitting driving torque between rotative members, having a hollow pintle-type inner joint member fixed to one of the rotative members, an outer member fixed to the other of the rotative members, and a plurality of roller balls received in apertures provided in the inner joint member. The roller balls engage grooves provided in the outer member. A resiliently biased plunger disposed in the hollow inner joint member has an inclined surface which engages the roller balls and displaces them radially into the grooves provided in the outer joint member. A manually displaceable plunger actuator provides for the manual displacement of the plunger disengaging the roller balls from the inclined surface and permitting the roller balls to move inwardly in a radial direction, and the separation of the inner joint member from the outer joint member.

11 Claims, 5 Drawing Sheets

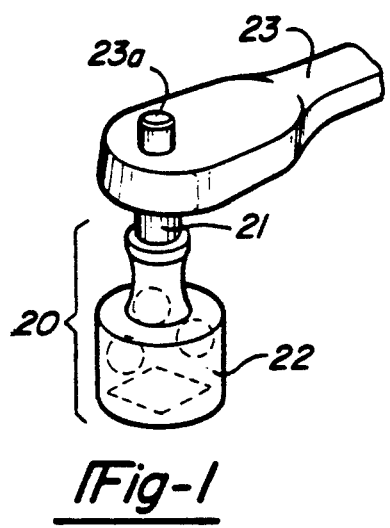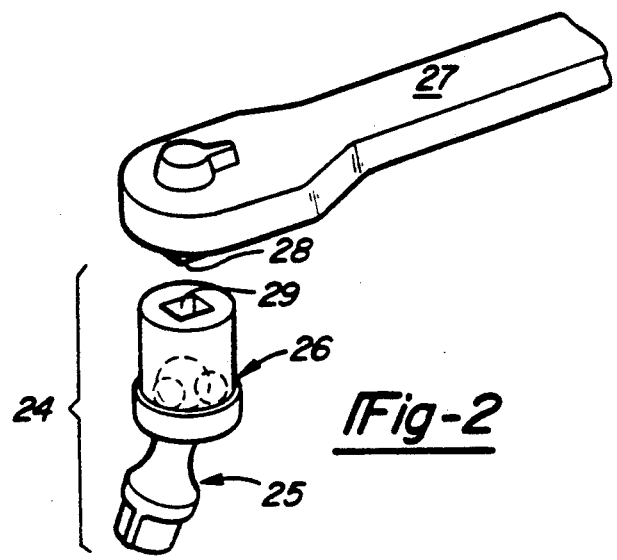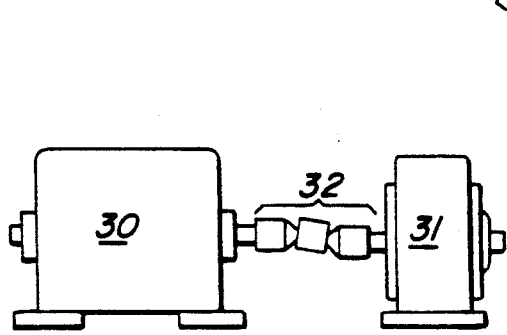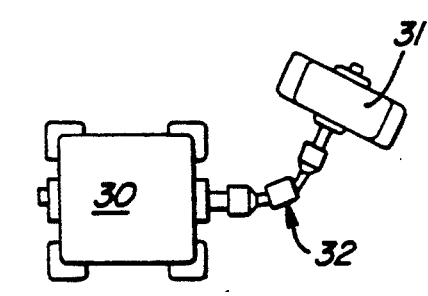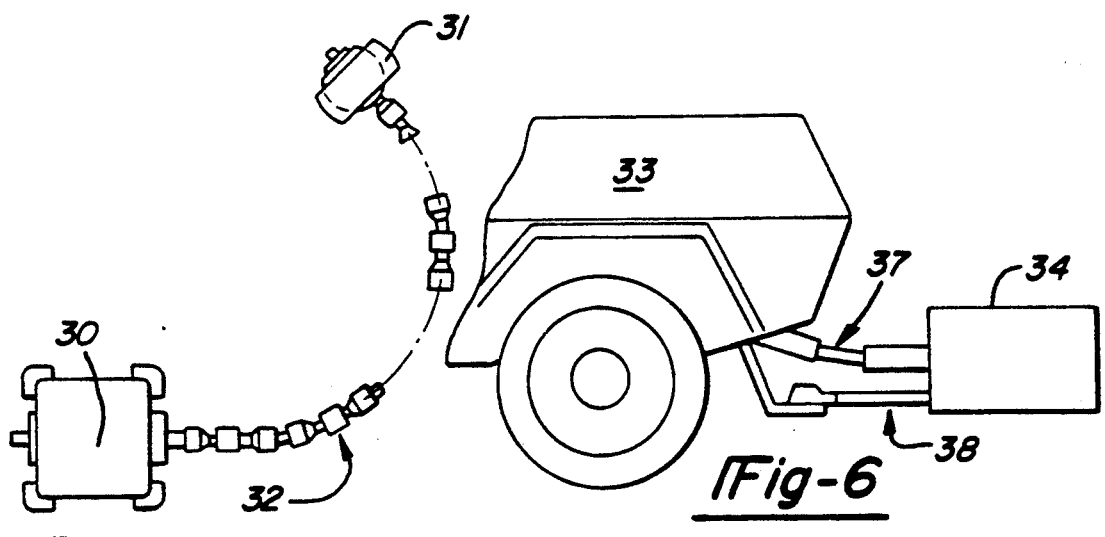

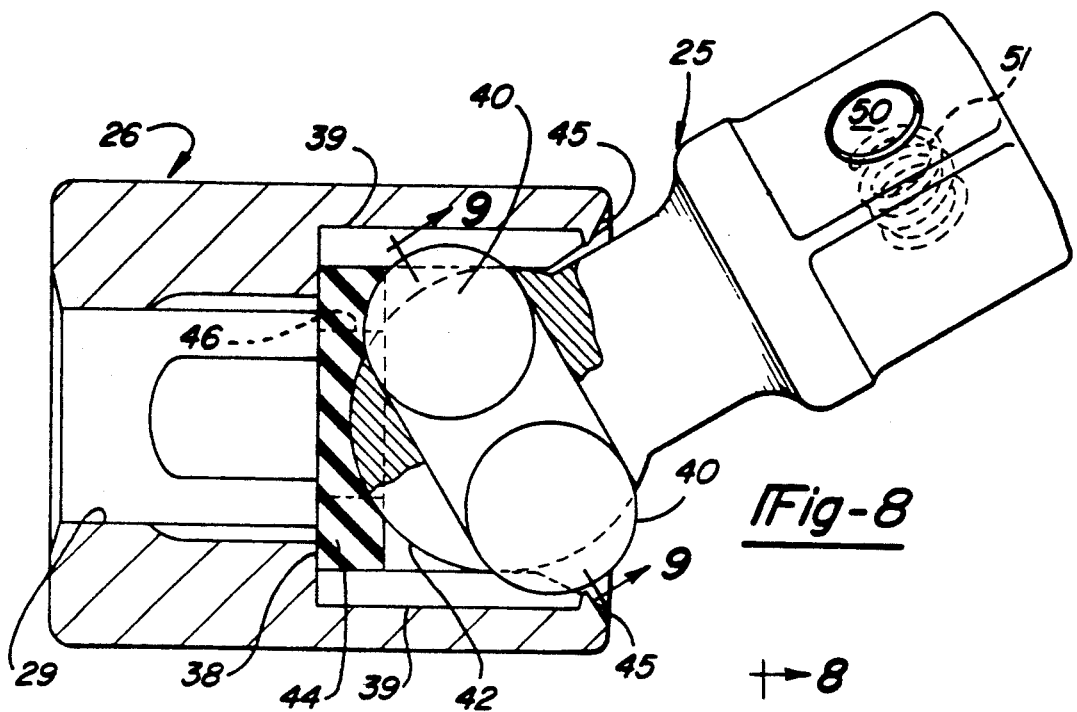
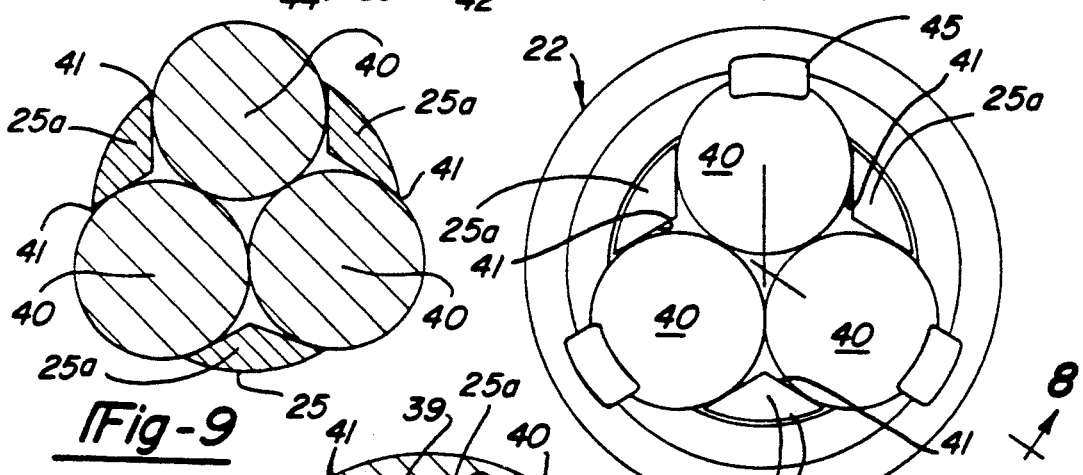
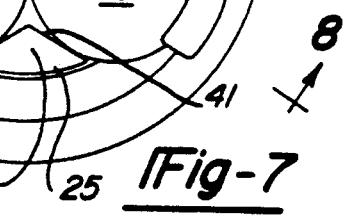
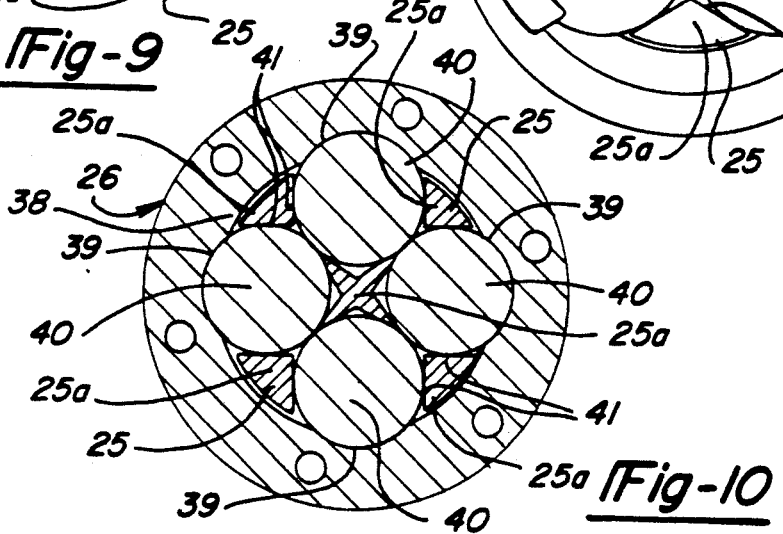

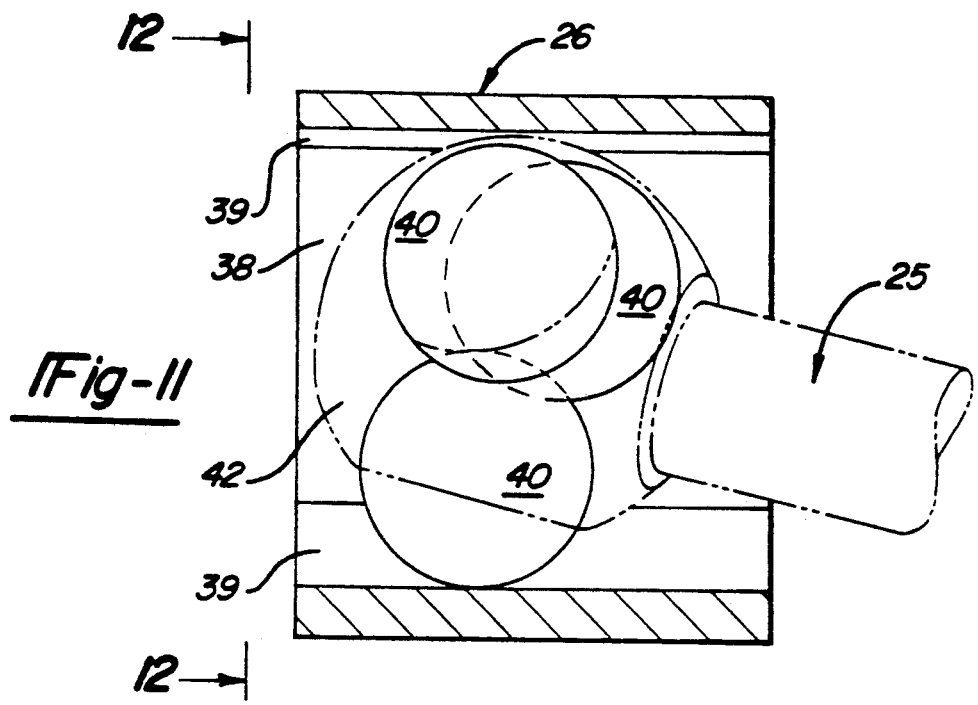
Fig-11
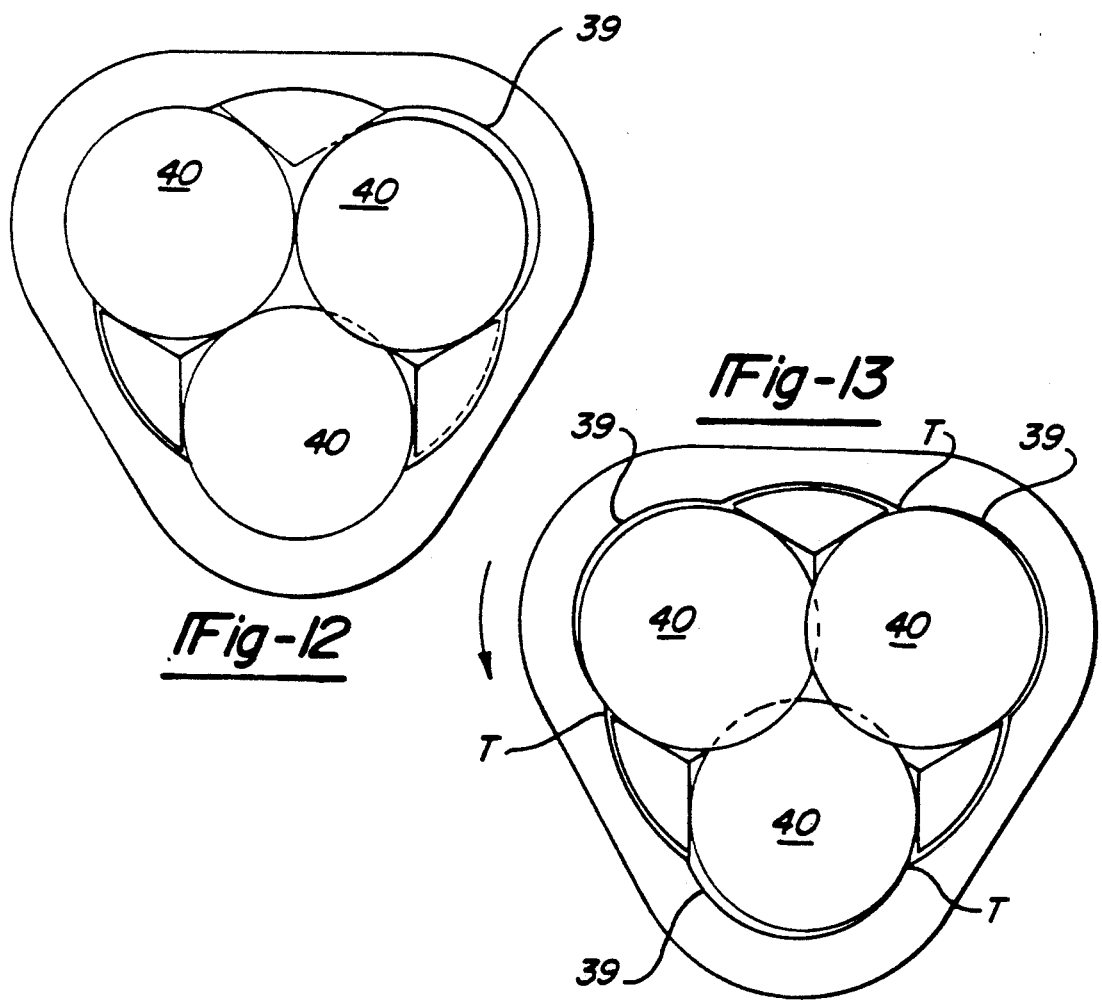
Fig-12
Fig-13

QUICK DISCONNECT CONSTANT VELOCITY UNIVERSAL JOINT

This is a continuation-in-part of application Ser. No. 07/552,260, filed Jul. 13, 1990, now abandoned, which was a continuation of U.S. Ser. No. 170,944, filed Mar. 21, 1988, now U.S. Pat. No. 4,941,862 issued Jul. 17, 1990 which was a divisional of U.S. Ser. No. 945,183, filed Dec. 23, 1986, now U.S. Pat. No. 4,753,626 issued Jun. 28, 1988.

BACKGROUND OF THE INVENTION

1. Field of the Invention

The present invention relates to constant velocity universal joints for connecting drive and driven members and, more particularly, the invention relates to quick disconnect universal joints embodying means for achieving constant velocity drive between the drive and driven members when the members are in high speed operation, offset at an angle, or have misalignment between the members. A multiplicity of such universal joints can be cascaded, or connected in series, to increase the degree of offset or misalignment that can be accommodated between the drive and driven members and/or the spacing therebetween.

2. Description of the Prior Art

Many efforts are shown in the known prior art to achieve better transmission of torque. These usually involve either a Cardan-type joint, such as shown in U.S. Pat. No. 4,156,354, or a constant velocity joint of the type shown in U.S. Pat. No. 2,910,845. Each of these devices involve transmission of torque between rotative members and can be said to involve an inner joint member fixed to one of the rotative members, and an outer joint member fixed to the other of the rotative members.

U.S. Pat. No. 4,156,354 shows a high-speed, high-torque transmitting joint where the torque is transmitted through roller bodies interposed between inner and outer joint members wherein the roller bodies are equidistantly spaced circumferentially of the joint assembly, with each roller body being received in planar recesses in the inner joint member for radially slidable engagement relative thereto. This construction increases the complexity and size of the joint, and requires close maintenance of surface finish and other manufacturing tolerances. Because of these reasons and the increased friction resulting from the sliding relationship of the planar surfaces, this type of joint has decreased smoothness of operation, while at the same time having increased manufacturing costs.

U.S. Pat. No. 2,910,845 shows a constant velocity universal joint intended for connecting two rotative members only where angularly misaligned joints are to be found, and not where axially aligned or slightly misaligned joints are to be found and, therefore, shows a joint limited in its usefulness. Further, the joint utilizes spherical drive members restrained to rotate about journals provided on the drive member. The restraining of the drive members provides increased friction, which is unsatisfactory in a universal joint.

What is needed to solve the above problems present in the prior art is an improved constant velocity universal joint usable for angular and axial misalignment and having increased smoothness of operation due to the elimination of planar surfaces on the drive members and which can be made with lower manufacturing costs because of less critical tolerances and surface finishes.

In addition, increased friction results because of the sliding relationship of the planar surfaces. For these reasons, it provides a generally unsatisfactory solution to the problem of torque transmission.

U.S. Pat. No. 2,910,845 utilizes spherical drive members restrained to rotate about journals provided on the drive member which again causes increased friction and is unsatisfactory.

SUMMARY OF THE PRESENT INVENTION

Briefly, the present invention is a quick disconnect constant velocity universal joint for transmitting driving torque including a pintle-type inner joint member fixed to one of the rotative members and an outer member fixed to the other of the rotative members, with a plurality of roller balls received in apertures provided in the inner joint member. The roller balls extend radially from the inner joint member and engage in rectilinear grooves provided in the outer joint member. A spherical portion of at least one of each of the roller balls is in contact with an inclined surface of a plunger. The plunger is resiliently biased such that the inclined surface radially displaces the roller balls into the rectilinear grooves operatively connecting the inner joint member to the outer joint member. Additionally, a cascaded joint made up of a multiplicity of such universal joints is also shown.

Thus, it is an object of the present invention to provide a quick disconnect constant velocity universal joint in which the inner joint member may be separated from the outer joint member.

It is a further object of the present invention to provide a quick disconnect constant velocity universal joint having the roller balls received in rectilinear grooves provided in the outer joint member thereof, the rectilinear grooves having cylindrical ball contact surfaces.

A further object of the present invention is to provide that the plane of torque transmission of the universal joint does not remain perpendicular to the axis of rotation as the joint is articulated.

A further object of the present invention is to provide a constant velocity universal joint with lower manufacturing costs than present day devices.

A further object of the present invention is to provide a constant velocity universal joint which eliminates the use of planar drive surfaces in the transmission of torque.

A further object of the present invention is to provide a constant velocity universal joint having increased smoothness.

A further object of the present invention is to provide a constant velocity universal joint having less critical manufacturing tolerances.

A further object of the present invention is to provide an improved constant velocity joint which is capable of transmitting torque over a smaller moment arm than prior art universal joints, thereby providing smaller size joints with smoother operation.

A still further object of the present invention is to provide a constant velocity universal joint that can be connected in series with a multiplicity of like universal joints in a cascaded joint to provide for relatively large amounts of offset or misalignment between the drive and driven members which are connected by such joints.

Further objects and advantages of the present invention will be apparent from the following description and appended claims, reference being made to the accompanying drawings forming a part of this specification, wherein like references characters designate corresponding parts in the several views.

BRIEF DESCRIPTION OF THE DRAWINGS

FIG. 1 is a diagrammatic view of a novel wrench embodying the universal joint of the present invention as the wrench drive;

FIG. 2 is a diagrammatic view illustrating a construction embodying the present invention in conjunction with a standard ratchet wrench of the square drive type;

FIG. 3 is a diagrammatic view showing a construction embodying the present invention being utilized where an offset between adjoining torque transmitting shafts is present;

FIG. 4 is a diagrammatic view showing a construction embodying the present invention in use where angular misalignment and/or offset is desires;

FIG. 5 is a diagrammatic view showing a construction embodying a multiplicity of universal joints of the present invention connected in series in a cascaded joint;

FIG. 6 is a diagrammatic view illustrating a construction embodying the present invention being used in a power take-off system;

FIG. 7 is a right end view of the outer joint member with the inner joint member in axial alignment with the outer member and partially cutaway;

FIG. 8 is a sectional view taken in the direction of the arrows along the section line 8—8 of FIG. 7;

FIG. 9 is a sectional view taken in the direction of the arrows along the section line 9—9 of FIG. 8;

FIG. 10 is a view similar to that of FIG. 7 but showing a version of the present invention having four roller balls instead of three;

FIG. 11 is an elevational view of a single constant velocity universal joint, partly in section, showing the inner joint member articulated;

FIG. 12 is a sectional view taken in the direction of the arrows along the section lines 12—12 of FIG. 11, and showing the universal joint at rest;

FIG. 13 is a view identical to FIG. 12, but showing the single constant velocity universal joint under operating conditions with torque applied to the inner joint member in the direction of the arrow;

Figure 14:
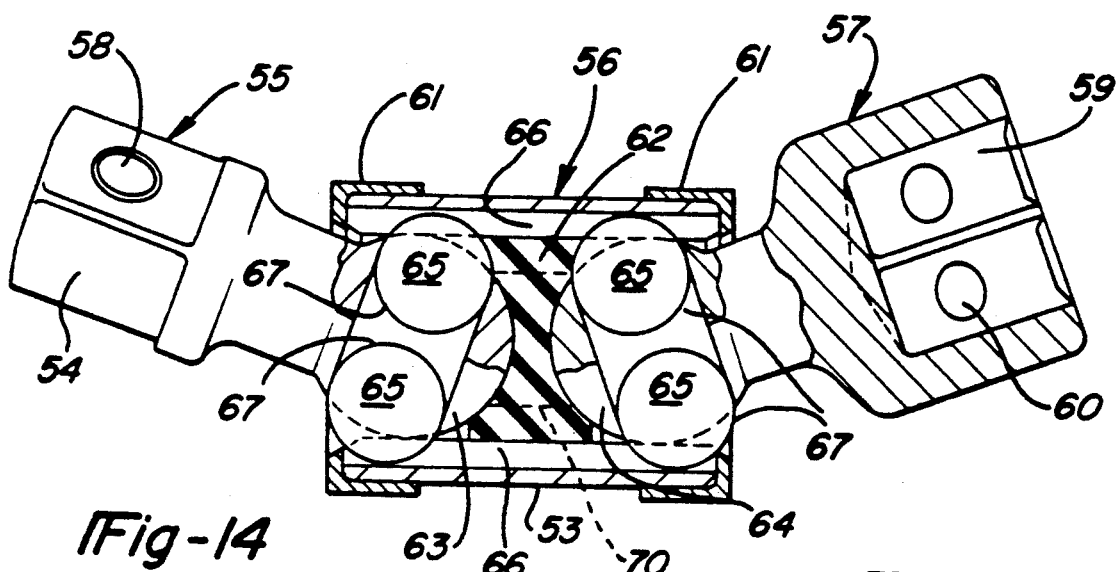
FIG. 14 is an elevational view, partly in section, of a double constant velocity universal joint.

It is understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

DETAILED DESCRIPTION OF THE PREFERRED EMBODIMENT

Referring to FIGS. 1 through 6, several uses of the present invention are shown. In FIG. 1 there is shown a novel ratchet wrench 23 having a constant velocity universal joint, generally designated by the numeral 20, included as an integral part thereof. The constant velocity universal joint 20 may be considered to be of the quick disconnect type, as hereinafter described, with the disconnect feature being actuated by a spring-load push button 23a. The joint 20 itself is made up of an outer joint member 22 and an inner joint or pintle member 21. The wrench 23 with the integral inner joint member 21 may be part of a set which includes a multiplicity of different sizes of sockets, each of which can interchangeably be assembled to the inner joint member 21 to serve as an outer joint member. It is, of course, also contemplated that other tools, such as screwdriver-type tools, pneumatic wrenches and other tools, and electric wrenches and other tools, can be constructed with an integral constant velocity universal joint.

In FIG. 2 there is shown a conventional ratchet wrench 27 of the square drive type, the drive being provided through an extension 28 which is square in cross-section, as is known in the art. The extension 28 fits into a socket 29 provided in an outer joint member 26 of a constant velocity universal joint 24. The universal joint 24 is of the non-quick disconnect type, as hereinafter described, and is made up of an inner joint or pintle member 25. It is also contemplated that the universal joint 24 can be applied to other types of driven tools, such as screwdrivers, pneumatic wrenches and screwdrivers, and electric wrenches and screwdrivers.

In FIG. 3 there is shown an application where offset and possible variation in axial spacing exists between the shaft of a motor 30 and the driver shaft of a gear box 31. The motor and gear box are shown joined by a double constant velocity universal joint 32 embodying the construction used in the present invention.

FIG. 4 shows the same motor and gear box as shown in FIG. 3 but under a condition where angular misalignment and/or offset is desired. Again, the shaft of the motor 30 and the driveshaft of the gear box 31 are joined by a double constant velocity universal joint, generally designated by the numeral 32.

FIG. 5 shows an application where a substantial offset exists between the shaft of the motor 30 and the driver shaft of the gear box 31. The motor and the gear box are joined by a cascaded series of universal joints 32 embodying the construction used in the present invention.

There is shown in FIG. 6 a situation where the construction of the present invention is used as a power take-off. A source of power such as a farm implement is illustrated by the numeral 33 and, thus, is towingly connected to a power actuated attachment 34. The implement 33 provides a driving force for the operation of the power attachment 34. In this case, a quick disconnect, single universal U-joint 37 is utilized in providing the driving force.

Referring now to FIGS. 7 and 8, the outer joint member 26 has the socket 29 provided in one end thereof to receive the ratchet wrench 27 shown in FIG. 2, or any other device to be driven. Immediately adjacent the socket 29 is an enlarged portion 38 having three rectilinear circumferentially spaced grooves 39. The grooves 39 may be spaced equally around the circumference, and have a right circular cylindrical shape in a plane extending transversely through the outer joint member 26 to receive the three spherical roller balls 40. In the single constant velocity universal joint the enlarged portion 38 of the outer joint member 26 receives the inner joint member, generally designated by the numeral 25. Before insertion, the three spherical roller balls 40 are inserted in circular apertures 41 provided in the head portion 42 of the inner joint member 25. The inner joint member 25 having the spherical roller balls 40 inserted therein is then, in turn, inserted into the enlarged portion 38 of the outer joint member 26 until the head portion 42 of the inner joint member 25 contacts a position washer 44. Slight additional force is then applied and the deformations 45 of the outer joint member are deformed, by staking or otherwise, a distance sufficient to prevent removal of the inner joint member 25.

Several considerations are important when the dimensions of the single constant velocity universal joint are considered. The circular apertures 41 in the head portion 42 of the inner joint member 25 must be such as to allow free rotation of the roller balls 40 and between segment portions 25a and ball-to-ball contact among the roller balls. The dimension across the grooves 39 of the outer joint member 26 must be such that when the inner joint member 25 is axially aligned with the outer joint member 26 there is a rolling plunge fit between the roller balls 40 and the rectilinear grooves 39.

The position washer 44 is preferably made of resilient material, such as duro nitrile or the like, and the relationship between the position washer and the deformations 45 must be such that the position washer 44 exerts enough pressure against the head portion 42 of the inner joint member 25 such that the pintle member, when articulated, will be able to hold any angle at which it is placed under its own weight. This feature conforms to a Society of Automotive Engineers standard. On source for the duro nitrile material used to make the position washer is Goshen Rubber Company. If desired, an aperture 46 may be provided in the position washer 44.

In addition, the deformations must be such as to keep all the roller balls 40 in the rectilinear grooves 39 when the inner joint member 25 is at its full angular articulation. The deformed areas are to allow no free axial movement, and they are not to interfere with the rotation of the shaft when it is at an angle of up to thirty degrees (30°) from the outer joint member 26.

It can be seen that with this construction there is ball-to-ball contact between the spherical roller balls 40, and that all the torque is transmitted through the roller balls 40 to the rectilinear spherical grooves 39.

It is contemplated that a version of the present invention utilizing four roller balls may be constructed, as shown in FIG. 10, and used when large amounts of torque are to be transmitted. As before, there are a plurality (in this case four) of rectilinear grooves 39 equally spaced around the circumference of the enlarged portion 38 of the outer joint member 26. The circular apertures 41 in the inner joint member 25 must meet the same requirements as before, and the four apertures 41 are provided at right angles to each other. In this case the cross section of the inner joint member 25 is reduced, so that some material is left to strengthen the inner joint member at the center thereof, as indicated by the numeral 25a, and ball-to-ball contact among the four spherical roller balls 40 is still maintained. It must be understood that torque transmission in any of these devices takes place mainly because of the interaction of the roller balls 40 in the spherical rectilinear grooves 39. It can be easily seen that versions of the present invention having more than four roller balls may be provided.

As shown in FIG. 8, to provide for easy attachment of the inner joint member or pintle 25 to a socket, not shown, or other device for receiving torque from the universal joint, the inner joint member 25 is provided with a standard ball detent in the form of a ball bearing 50 held in place by the spring 51.

Referring now to FIG. 11, there is shown a version of the single constant velocity universal joint having a different outer configuration from the device above described. The socket 29 thereof is not shown for ease of illustration. As before, the outer joint member 26 has an enlarged portion 38 having a plurality of spaced rectilinear grooves 39 in which a plurality of roller balls 40 are received. The grooves 39 are preferably cylindrical in transverse section as in the case of the universal joint illustrated in FIGS. 7 and 8. The roller balls 40 are received in circular apertures in the head portion 42 of the inner joint member 25. It can be seen that as the inner joint member or pintle is articulated, as soon as the inner joint member articulates to an axis away from the axis of the outer joint member, the plane of torque transmission is no longer perpendicular to the axis of the outer joint member because the roller balls 40 pull away from the rectilinear grooves 39. This is possible because of the unrestricted rotation and linear translation (movement) of the roller balls 40 of this invention, a feature not present in the previously discussed prior art devices.

As FIG. 12 shows, when the constant velocity universal joint is at rest one of the roller balls 40 pulls substantially out of the groove 39, while the remainder of the roller balls 40 are held against the grooves by gravity. However, as shown in FIG. 13, as soon as the joint starts to rotate, because of circumferential forces, the roller balls 40 all assume a position approximately equidistant from the axis of rotation of the inner joint member 25 and all are slightly out of the rectilinear grooves 39. As can be seen, the point of torque transmission in this situation becomes a point-to-point contact at approximately the same position, respectively, between the roller balls 40 and each of the rectilinear grooves 39. It is believed that the moment arm from the center of rotation to the point T, for the present invention, is smaller than any of the previously discussed prior art devices thereby providing for more efficient and smoother torque transmission. This feature, coupled with the unrestricted rotation of the balls as the joint is rotated, provides for lower frictional forces also, making the present joint a substantial advance over the prior art.

A version of the present invention as embodied in a double constant velocity universal joint can be seen in FIG. 14. The double constant velocity universal joint shown in FIG. 14 consists of a driveshaft, generally designated by the numeral 55; a barrel race, generally designated by the numeral 56; and a driver, generally designated by the numeral 57.

The driveshaft 55 has a squared off extension portion 54 for ease of attachment to other devices, and is provided with the standard detent ball 58 which is spring-loaded as described hereinbefore. Of course, the extension portion 54 could also be round, and this would be the preferred configuration in the case of a universal joint intended to be connected to the driveshaft of a motor, for example. In any case, a head portion 63 of the driveshaft is similar to the single constant velocity universal joint just described in that it has a plurality of circular apertures 67 spaced equidistantly around the head portion to receive a plurality of roller balls 65. As before, there is ball-to-ball contact between the roller balls 65 as in the single constant velocity universal joint. The driveshaft 55 is inserted into the barrel race 56 and one of the identical end caps 61, which was placed over the head portion 63 of the driveshaft 55 before the roller balls 65 were inserted, is press-fit onto a barrel 53. A position pad 62 is then inserted, and a second identical end cap is placed over the head portion 64 of the driver 57, the identical roller balls 65 are placed in identical circular apertures 67, and then the end cap 61 is press-fit onto the barrel 53. In the illustrated embodiment there are three roller balls 65 in the driveshaft and the driver and, therefore, there will be three equally spaced rectilinear grooves 66 in the barrel 53. As before, the dimensions across the grooves are of importance. When the axis of the driveshaft and/or driver are in alignment with the axis of the barrel the dimensions across the roller balls 65 and the rectilinear grooves 66 must be such as to provide a rolling plunge fit.

Likewise, the dimension of the position pad 62 is important. As before, this position pad is preferably made of resilient material, such as duro nitrile, and must be of sufficient dimension such that when the end caps 61 are in place it exerts sufficient force against the head portion 63 of the driveshaft and the head portion 64 of the driver 57 so that the driver and the driveshaft will hold any angle they are placed at under their own weight. If desired, a hole 70 may be placed in the position pad 62. To complete the construction, a socket 59 having a standard detent 60 is provided in the driver 57.

Figure 15:
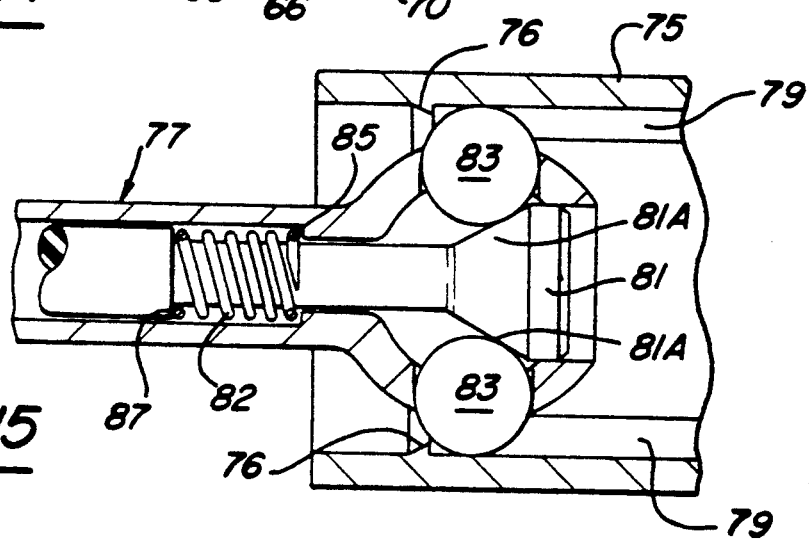
FIG. 15 is an elevational view partly in section of a single constant velocity universal joint having the quick disconnect feature of the present invention.
Figure 16:
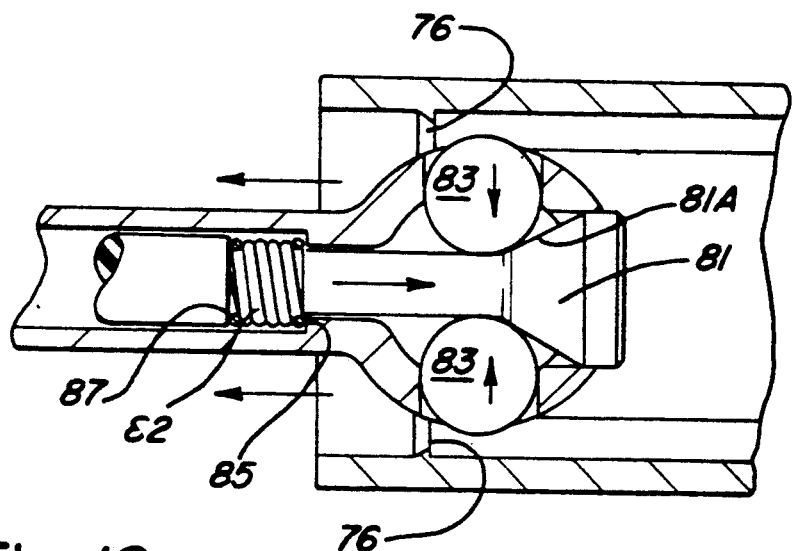
FIG. 16 is a view identical to FIG. 15 but showing the plunger of the inner joint member in its activated position so that the roller balls may drop inwardly toward the plunger and the inner joint member may be removed from the outer joint member.

In embodiments where a quick disconnect version of a constant velocity universal joint is required, the version of the invention shown in FIGS. 15 and 16 may be used. For ease of illustration, there is shown a version of the universal joint of the present invention having two roller balls, but it should be understood that versions having three and four roller balls, such as those just described, or any practical number, may also be constructed in this manner.

In the quick disconnect universal drive shown in FIGS. 15 and 16, as before, there is an outer drive member 75 having a plurality of right circular cylindrical rectilinear grooves 79 into which roller balls 83 are received. Deformations 76 are provided for the purposes previously described, but in this instance the inner drive member 77, because of its construction, can permit the roller balls 83 to move inwardly toward the center of the joint a distance sufficient to clear the deformations 76. This is accomplished by having the inner drive member be hollow in construction and be provided with a plunger 81 having an inclined surface 81A against which the roller balls 83 rest. The plunger 81 is received in the hollow interior of the inner drive member 77 and is retained in a retracted position by a spring 82, as shown in FIG. 15. Since the spring is retained between a bearing portion 85 on the interior of the inner drive member and a land 87 provided on the plunger 81, when the plunger is pushed in a direction toward the outer drive member 75 towards an extended position as shown in FIG. 16, the spring 82 will be compressed with the plunger in the extended position and the roller balls 83 will collapse toward the axis of the plunger. The diameter of the plunger adjacent to the inclined surface 81A is selected to permit the roller balls 83 to move inwardly a distance sufficient to clear the deformations 76, thus allowing the disassembly of the inner drive member 77 from the outer drive member 75, as illustrated in FIG. 16.

Figure 17:
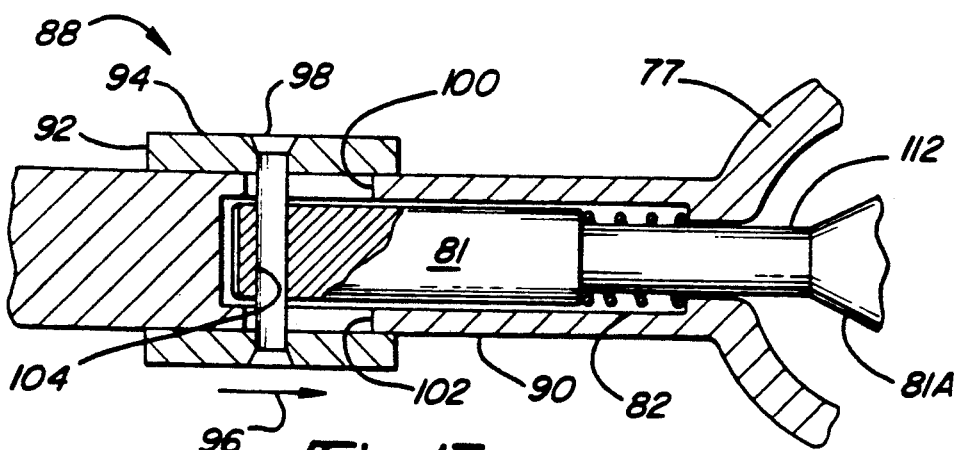
FIG. 17 is a partial cross-sectional side view of the hollow inner joint member showing a first embodiment of the plunger actuator mechanism.

As shown in FIG. 17, the plunger 81 may be displaced against the force of the spring 82 by means of a plunger actuator 88 slidably circumscribing a hollow shaft portion 90 of the inner drive member 77. The plunger actuator 88 consists of a sleeve 92 having a cylindrical configuration which slidably circumscribes the hollow shaft portion 90. An external surface 94 of the sleeve 92 is preferably knurled to facilitate the axial displacement of the sleeve 92 along the hollow shaft portion 90 in the direction indicated by arrow 96. A diametrically disposed pin 98 is attached to the sleeve 92 and extends through a pair of diametrically disposed slots 100 and 102 provided through the walls of the hollow shaft portion 90 in the region of the plunger 81 and through a diametrically disposed bore 104 provided through the plunger 81.

Figure 18:
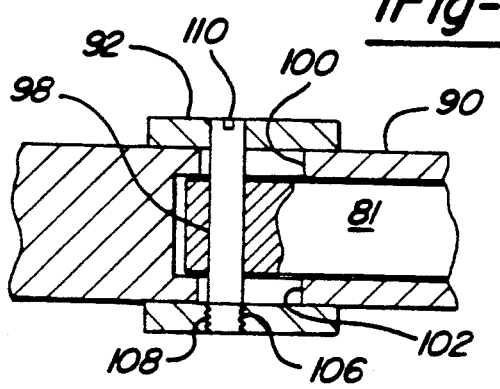
FIG. 18 is a partial cross-sectional side view showing an alternate method for maintaining the pin.

The pin 98 may be a cylindrical rod having its opposite ends deformed or flattened to secure it to the sleeve 92 as shown in FIG. 17. Alternatively, the pin 98 may have a threaded portion 106 which is threaded into a threaded bore 108 provided in the opposite wall of the sleeve 92 as shown in FIG. 18. A screw driver slot 110 or any other tool accepting recess is provided in one end of the pin 98 to facilitate the threading of the threaded portion 106 into the threaded bore 108.

As discussed relative to FIGS. 15 and 16, the plunger 81 is disposed in the hollow shaft portion 90 of the inner drive member 77 and is biased towards a retracted position by the spring 82 in which the roller balls 83 are displaced radially outwardly by the inclined surface 81A into the rectilinear grooves 79 of the outer drive member 75.

Manual displacement of the plunger actuator 88 in the direction indicated by the arrow 96 will axially displace the plunger 81 to an extended position as shown in FIG. 16. In the extended position, the roller balls 83 are free to collapse onto a cylindrical portion 112 of the plunger 81 adjacent to the inclined surface 81A. The diameter of the cylindrical portion 112 is selected to permit the roller balls 83 to contract radially in a distance sufficient to permit the roller balls 83 to clear the deformations 76. The radial contraction of the roller balls 83 allows the insertion or separation of the inner drive member 77 from the outer drive member 75.

To connect the inner drive member 77 to the outer drive member 75, the plunger actuator 88 is manually displaced in the direction of the arrow 96 against the force of the spring 82. The manual displacement of the plunger actuator 88 will axially displace the plunger 81 allowing the roller balls 83 to radially collapse onto the surface of the cylindrical portion 112 of the plunger 81. In this state, the roller ball 83 will clear the deformations 76 permitting the inner drive member 77 to be inserted into the outer joint member 75. Upon release of the plunger actuator 88, the spring 82 will produce a force sufficient to axially displace the plunger 81 back to its retracted position as shown in FIG. 15. The displacement of the plunger 81 will also displace the plunger actuator 88 to the position shown in FIG. 19. In the retracted position of the plunger 81, the inclined surface 81A provided at the ends of the plunger 81 will radially displace the roller balls 83 into the rectilinear grooves 79. With the roller balls 83 radially displaced into the rectilinear grooves 79, the deformations 76 will lock the inner drive member 77 to the outer drive member 75.

This embodiment of the quick disconnect constant velocity universal joint is particularly applicable to the power take-off applications shown in FIGS. 3 through 6. In these power take-off applications, it is often necessary or desirable to quickly connect or disconnect the driven member from the driving member. In this application of the quick disconnect constant velocity universal joint, no tools are required for either effecting a connection or disconnection between the driven and driving members.

Figure 19:
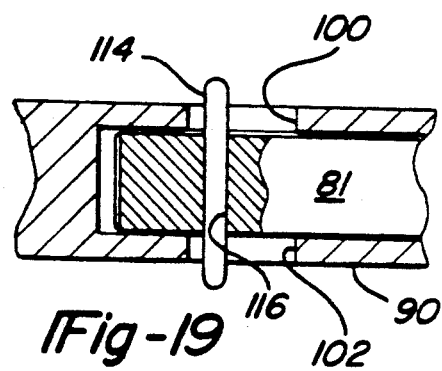
FIG. 19 is a partial cross-sectional side view showing a second embodiment of the plunger actuator mechanism.

A second embodiment of the plunger actuator is shown in FIG. 19. This embodiment is substantially the same as the embodiment shown in FIG. 17 except that the cylindrical sleeve 92 is omitted. As shown in FIG. 19, a diametrically disposed pin 114 is press fit into a diameterically disposed bore 116 provided through the plunger 81. The end of the pin 114 extends through the longitudinal slots 100 and 102 provided in the hollow shaft portion 90 of the inner drive member 77 and can be manually engaged to displace the plunger 81 from its retracted position to its extended position.

Figure 20:
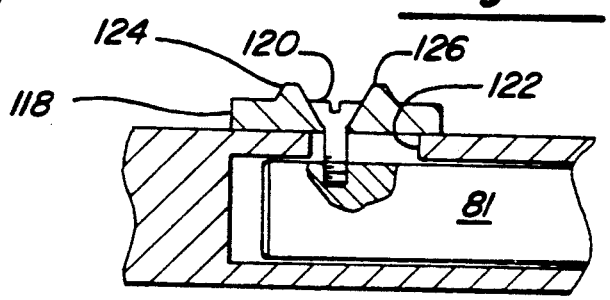
FIG. 20 is a partial cross-sectional side view of the hollow inner joint mechanism showing a third embodiment of the plunger actuator.

A third embodiment of the plunger actuator is shown in FIG. 20. In this embodiment, an actuator lever 118 is connected to the plunger 81 by means of a screw 120 threadably received in a threaded bore provided in the plunger 81. The screw 120 passes through a longitudinal slot 122 provided in the wall of the hollow shaft portion 90 as shown. Preferably the length and the width of the actuator lever 118 is selected so that it covers the longitudinal slot 122 to prevent dirt from entering into the hollow shaft portion 90. Also, transverse ridges such as ridges 124 and 126 may be provided on the external surface of the actuator lever 118 to facilitate its manual displacement. The operation of this embodiment is the same as the operation of the embodiment shown in FIG. 17.

Figure 21:
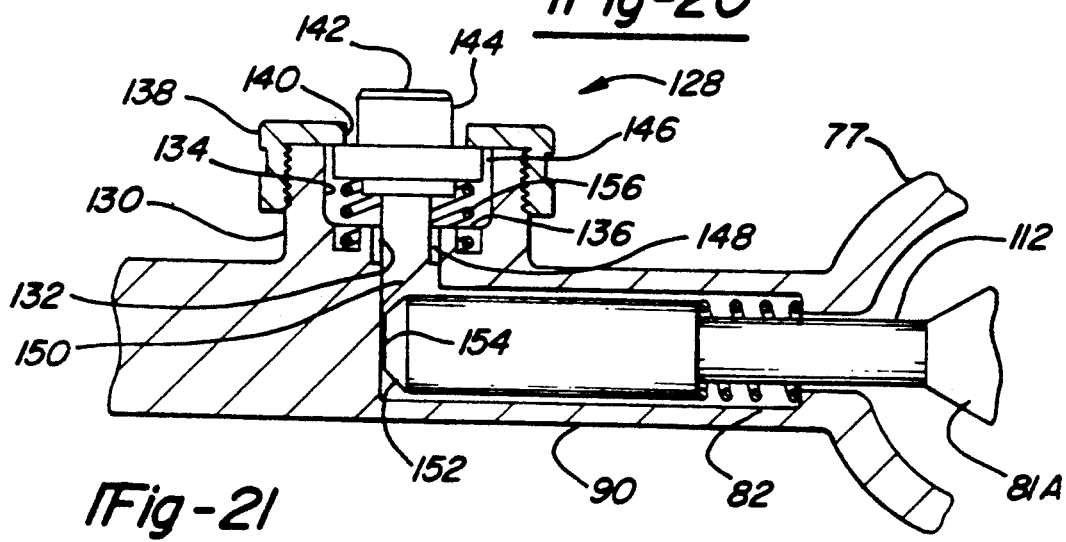
FIG. 21 is a partial cross-sectional side view of the hollow inner joint mechanism showing a fourth embodiment of the plunger actuator.

A fourth embodiment of the plunger actuator is shown in FIG. 21. A plunger actuator 128 shown in FIG. 21 has a cylindrical boss 130 extending normal to the surface of the hollow shaft portion 90 of the inner drive member 77. The boss 130 has a guide bore 132 passing therethrough. The guide bore 132 has a countersunk portion 134 which has a diameter greater than the guide bore 132. A shoulder 136 is formed at the bottom of the countersunk portion 134.

A portion of the external surface of the cylindrical boss 130 is threaded. A cap 138 having a mating threaded internal surface is threaded onto the cylindrical boss 130 as shown. The cap 138 has an aperture 140 concentric with the guide bore 132 to allow a head 142 of a release button 144 to pass therethrough. The release button 144 further has an annular rim 146 slidably disposed in the countersunk portion 134 and an actuator rod 148 slidably received in the guide bore 132. The annular rim 146 limits the axial displacement of the release button 144 between the shoulder 136 formed at the bottom of the countersunk portion 134 and the internal surface of the cap 138. The actuator rod 148 has an inclined cam surface 150 provided at the end opposite the head 142. The inclined cam surface 150 of the release button 144 slidably engages a mating cam surface, such as a truncated conical surface 152, provided at the internal end 154 of the plunger 81.

As discussed relative to FIGS. 15 and 16, the plunger 81 is disposed in the hollow interior of the inner drive member 77 and is biased towards the retracted position by the spring 82. The spring 82 biases the truncated conical surface 152 of the plunger 81 towards the inclined cam surface 150 of the release button 144. The release button 144 is biased towards the internal surface of the cap 138 by a spring 156. When the annular rim 146 engages the internal surface of the cap 138, the inclined cam surface 150 may be separated from the truncated conical surface 152 of the plunger 81 to permit the plunger to move axially when the inner drive member 77 is angularly displaced relative to the outer drive member 75. Conversely, the spring 156 may be inserted between the annular rim 146 and the inner surface of the cap 138 and maintain the inclined cam surface 150 of the release button 144 in contact with the truncated conical surface 152 of the plunger.

The relationship between the inclined cam surface 150 and the truncated conical surface 136 is such that manual depression of the release button 144 causes the inclined cam surface 150 to axially displace the plunger 81 towards its extended position as shown in FIG. 16. As shown, when the plunger 81 is displaced towards its extended position, the roller balls 83 will collapse onto the cylindrical portion 112 of the plunger 81 which, as previously described, has a diameter selected to permit the roller balls to clear the deformations 76. Therefore, when the release button 144 is fully depressed, the inner drive member 77 may be disconnected from the outer drive member 75.

To connect the inner drive member 77 to the outer drive member 75, the release button 144 is fully depressed displacing the plunger from its retracted position towards its extended position. The displacement of the plunger 81 allows the roller balls 83 to collapse onto the cylindrical portion 112 of the plunger 81. In this state, the roller balls will clear the deformations 76 allowing the inner drive member 77 to be inserted into the outer drive member 75. Subsequent release of the release button 144 will allow the spring 82 to produce a force axially displacing the plunger 81 towards its retracted position as shown in FIG. 15 in which the inclined surface 81A provided at the end of the plunger 81 will radially displace the roller balls 83 into the rectilinear grooves 79. With the roller balls 83 radially displaced into the rectilinear grooves 79, the deformations 76 will lock the inner drive member 77 to the outer drive member 75.

Thus, by abandoning prior art techniques, which require the rotation of the roller balls to be restricted, a novel constant velocity universal joint is provided. It should be understood that the invention is not limited to the foregoing embodiments, and that many changes and modifications can readily be made by one skilled in the art without departing from the scope of the claims appended hereto.

What is claimed is:

1. A quick disconnect constant velocity universal joint comprising:
    a hollow inner joint member having an axis of rotation, said hollow inner joint member having an external spherical surface and a plurality of radial apertures, said plurality of radial apertures being provided through the wall of said hollow inner joint member along a common plane transverse to said axis of rotation;
    a plurality of roller balls, one disposed in each of said radial apertures, said roller balls being free to move in said radial apertures in a radial direction between a predetermined innermost position to a predetermined outermost position;
    an outer joint member having a cylindrical portion for receiving said external spherical surface of said hollow inner joint member therein, the inner surface of said cylindrical portion having a plurality of rectilinear grooves provided therein, one rectilinear groove for each of said plurality of roller balls;
    plunger means for radially displacing said plurality of roller balls between said predetermined innermost position and said predetermined outermost position, said plunger means being disposed in said hollow inner joint member and having a plunger and resilient means for biasing said plunger from an extended position towards a retracted position, said plunger having a straight tapered portion near one end thereof, said straight tapered portion of said plunger radially displacing said plurality of roller balls from said predetermined innermost position to said predetermined outermost position in response to said displacement of said plunger from said extended portion towards said retracted position by said resilient means, said plurality of roller balls in said predetermined innermost position permitting said hollow inner joint member to be inserted into and separated from said outer joint member in said predetermined outermost position, said plurality of roller balls extending into said rectilinear grooves operatively connecting said hollow inner joint member to said outer joint member, said resilient means biasing said plunger towards said retracted position to maintain said straight tapered portion of said plunger in contact with said plurality of roller balls to produce a radial force on said plurality of roller balls, maintaining said plurality of roller balls in intimate contact with said plurality of rectilinear grooves of said outer joint member; and
    plunger actuator means coupled to said hollow inner joint member for displacing said plunger from said retracted position to said extended position against the force of said resilient means in response to a manual actuation.

2. The quick disconnect constant velocity universal joint of claim 1 further comprising a plurality of deformations provided in said plurality of rectilinear grooves to inhibit the separation of said hollow inner joint member from said outer joint member when said plurality of roller balls are being displaced towards their predetermined outermost position by said plunger.

3. The quick disconnect constant velocity universal joint of claim 1 wherein said plurality of radial apertures are equally spaced about said hollow inner joint member and said plurality of rectilinear grooves are equally spaced about said inner surface of said cylindrical portion of said outer joint member.

4. The quick disconnect constant velocity universal joint of claim 1 wherein each rectilinear groove of said plurality of rectilinear grooves, has a cylindrical cross-section.

5. The quick disconnect constant velocity universal joint of claim 1 wherein said plunger actuator means comprises:
    a pair of diametrically opposed olongitudinal slots provided in said hollow inner joint member adjacent to an internal end of said plunger when said plunger is in said retracted position;
    a cylindrical sleeve slidably coupled to said hollow inner joint member juxtaposed to said pair of diametrically opposed longitudinal slots; and
    a diametrically disposed pin connected to said cylindrical sleeve, said diametrically disposed pin extending through said pair of diametrically opposed longitudinal slots and engaging said plunger, wherein the displacement of said diametrically disposed pin from the end of said pair of diametrically opposed longitudinal slots to the other end by a manual displacement of said cylindrical sleeve displaces said plunger from said retracted position to said extended position.

6. The quick disconnect constant velocity universal joint of claim 5 wherein said diametrically disposed pin is received in a bore provided in said plunger.

7. The quick disconnect constant velocity universal joint of claim 1 wherein said plunger actuator means comprises:
    at least one longitudinal slot provided in said hollow inner joint member adjacent to said plunger, said at least one longitudinal slot having a forward end and a remote end;
    an actuator lever attached to said plunger near said remote end of said at least one longitudinal slot when said plunger is in said retracted position, said actuator lever protruding through said at least one longitudinal slot, said actuator lever manually displaceable within said at least one longitudinal slot from said remote end to displace said plunger from said retracted position to said extended position.

8. The quick disconnect constant velocity universal joint of claim 7 wherein said at least one longitudinal slot consists of two diametrically opposed longitudinal slots and wherein said actuating lever is a pin fixedly received in a diametrically disposed bore provided in said plunger, said pin protruding through both of said two diametrically opposed longitudinal slots.

9. The quick disconnect constant velocity universal joint of claim 1 wherein said plunger has a first inclined cam surface provided at an end opposite said one end, said plunger actuator means comprises:
    a boss provided on said hollow inner joint member normal to said axis of rotation, said boss having a guide bore passing therethrough, said guide bore having a larger diameter countersunk portion forming a release button chamber;
    a release button having an actuator rod slidably received in said guide bore, a cylindrical rim slidably received in said countersunk portion and a head axially protruding from said cylindrical rim, said actuator rod having a second inclined cam surface engagable with said first inclined cam surface of said plunger to longitudinally displace said plunger towards said extended position; and a cap attached to said boss captivating said cylindrical rim in said countersunk portion, said cap having an aperture concentric with said guide bore, said head of said release button extending through said cap, wherein depression of said release button towards said cap causes said second inclined cam surface to engage said first inclined cam surface, longitudinally displacing said plunger towards said extended position against the force of said resilient means.

10. The quick disconnect constant velocity universal joint of claim 9 wherein said first inclined cam surface is a truncated cone provided at said end of said plunger opposite said one end.

11. The quick disconnect constant velocity universal joint of claim 9 further comprising a resilient member disposed between said cylindrical rim of said release button on the bottom of said countersunk portion to bias said cylindrical rim against said cap to prevent said release button from rattling.

* * * * *